United States Patent
Li et al.

(10) Patent No.: US 12,548,111 B2
(45) Date of Patent: Feb. 10, 2026

(54) COMPRESSION METHOD AND ASSOCIATED ELECTRONIC DEVICE

(71) Applicant: Realtek Semiconductor Corp., HsinChu (TW)

(72) Inventors: Tsung-Hsuan Li, HsinChu (TW); Wan-Ju Tang, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 437 days.

(21) Appl. No.: 18/088,794

(22) Filed: Dec. 27, 2022

(65) Prior Publication Data

US 2023/0206389 A1 Jun. 29, 2023

(30) Foreign Application Priority Data

Dec. 29, 2021 (TW) .................. 110149316

(51) Int. Cl.
*G06T 3/40* (2024.01)
*G06T 9/00* (2006.01)

(52) U.S. Cl.
CPC . *G06T 3/40* (2013.01); *G06T 9/00* (2013.01)

(58) Field of Classification Search
CPC ...... H04N 5/917; H04N 5/919; H04N 5/9261; H04N 5/9264; H04N 11/02
See application file for complete search history.

(56) References Cited

U.S. PATENT DOCUMENTS

| | | | |
|---|---|---|---|
| 2005/0175088 A1* | 8/2005 | Wemelsfelder | H04N 19/152 375/240.03 |
| 2008/0298702 A1* | 12/2008 | Gunupudi | H04N 19/18 382/251 |
| 2011/0129163 A1* | 6/2011 | Liang | H04N 19/132 382/248 |
| 2021/0321105 A1 | 10/2021 | Hsiang | |

OTHER PUBLICATIONS

Benzid et al., "Electrocardiogram Compression Method Based on the Adaptive Wavelet Coefficients Quantization Combined to a Modified Two-Role Encoder", DOI: 10.1109/LSP.2006.887841, 2007 (Year: 2007).*
JPEG, Wikipedia, https://en.wikipedia.org/wiki/JPEG (Year: 2020).*
(Continued)

*Primary Examiner* — Chan S Park
*Assistant Examiner* — Promotto Tajrian Islam
(74) *Attorney, Agent, or Firm* — Winston Hsu

(57) ABSTRACT

The present invention provides a compression method, wherein the compression method includes the steps of: setting a quantization function; setting a plurality of scaling ratios; receiving image data; for a block of a frame of the image data, using a conversion matrix to convert data of the block to generate a plurality of converted data; determining a specific scaling ratio from the plurality of scaling ratios according to the plurality of converted data; and using the quantization function to perform a quantization operation on a plurality of adjusted data to generate compressed data, wherein the plurality of adjusted data are generated according to the plurality of converted data and the specific scaling ratio.

6 Claims, 2 Drawing Sheets

(56) References Cited

OTHER PUBLICATIONS

MPEG-1, Wikipedia, https://en.wikipedia.org/wiki/JPEG (Year: 2020).*
"Predictive Coding", Department of Telecommunication Systems, Media Technology; https://www.ic.tu-berlin.de/fileadmin/fg121/Source-Coding_WS12/06_Predictive-Coding.pdf ,2013.
"Transform Coding", Department of Telecommunication Systems, Media Technology; https://www.ic.tu-berlin.de/fileadmin/fg121/Source-Coding_WS12/07_Transform-Coding.pdf ,2013.
"Quantization", Department of Telecommunication Systems, Media Technology; https://www.ic.tu-berlin.de/fileadmin/fg121/Source-Coding_WS12/05_Quantization-WS12.pdf ,2012.
"Compressive Sensing", Iowa State University of Science and TEchnology; https://home.engineering.iastate.edu/~namrata/EE527_Spring08/CompSens2.pdf ,2021.
"Differential Pulse Code Modulation", Stanford University; https://web.stanford.edu/class/ee368b/Handouts/15-DPCM.pdf ,2021.
"Scalar and Vector Quantization", Multimedia Architecture and Processing Laboratory, National Yang Ming Chiao Tung University; http://mapl.nctu.edu.tw/course/VC_2013/files/Lecture4-3.pdf ,2013.
"Hadamard transform", Wikipedia; https://en.wikipedia.org/wiki/Hadamard_transform ,2021.

* cited by examiner

COMPRESSION METHOD AND ASSOCIATED ELECTRONIC DEVICE

BACKGROUND OF THE INVENTION

1. Field of the Invention

The present invention relates to a compression method with quantization.

2. Description of the Prior Art

In order to reduce amount of data of the image, generally, it can be performed by a data compression method with quantization, wherein the amount of compressed data mainly depends on a bit number of each codeword in a codebook, that is, how many bits are needed to represent an index of each codeword, and the data amount of each data unit (for example, a luminance value of each pixel) can be represented by the index value with fewer bits for subsequent storage or transmission. In addition, in order to reduce compression distortion as much as possible, it is desirable that the difference between each data unit and its nearest codeword should be as small as possible. Therefore, a common method can be achieved by using a predictor or transformation to make the distribution of the data as close to zero as possible, and obtain a smaller quantization error by means of non-uniform quantization.

However, when the predictor is inaccurate, or the transformation cannot be a sparse representation of the data, the data may be far from zero, or even exceed the boundaries of the codebook, resulting in an overload phenomenon. In order to solve the overload problem, one method is to increase the number of codewords, but increasing the number of codewords will increase the amount of data. In addition, it is also possible to prevent data from exceeding the numerical boundaries of the codebook by extending the boundaries of the codebook, but this may result in a lower sampling rate of the codewords, resulting in more severe granular noise and edge busyness.

SUMMARY OF THE INVENTION

It is therefore an objective of the present invention to provide an adaptive data compression method, which can reduce the amount of data as much as possible and reduce the degree of granular noise and edge busyness while avoiding overload, to solve the problems described in the prior art.

According to one embodiment of the present invention, a compression method comprises the steps of: setting a quantization function; setting a plurality of scaling ratios; receiving image data; for a block of a frame of the image data, using a conversion matrix to convert data of the block to generate a plurality of converted data; determining a specific scaling ratio from the plurality of scaling ratios according to the plurality of converted data; and using the quantization function to perform a quantization operation on a plurality of adjusted data to generate compressed data, wherein the plurality of adjusted data are generated according to the plurality of converted data and the specific scaling ratio.

According to one embodiment of the present invention, an electronic device comprising a compression circuit is disclosed, wherein the compression circuit sets a quantization function and a plurality of scaling ratios, and the compression circuit comprises a scaling ratio determination circuit and a quantization circuit. The scaling ratio determination circuit is configured to receive image data, and for a block of a frame of the image data, use a conversion matrix to convert data of the block to generate a plurality of converted data, and determine a specific scaling ratio from the plurality of scaling ratios according to the plurality of converted data. The quantization circuit is coupled to the scaling ratio determination circuit, and is configured to use the quantization function to perform a quantization operation on a plurality of adjusted data to generate compressed data, wherein the plurality of adjusted data are generated according to the plurality of converted data and the specific scaling ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
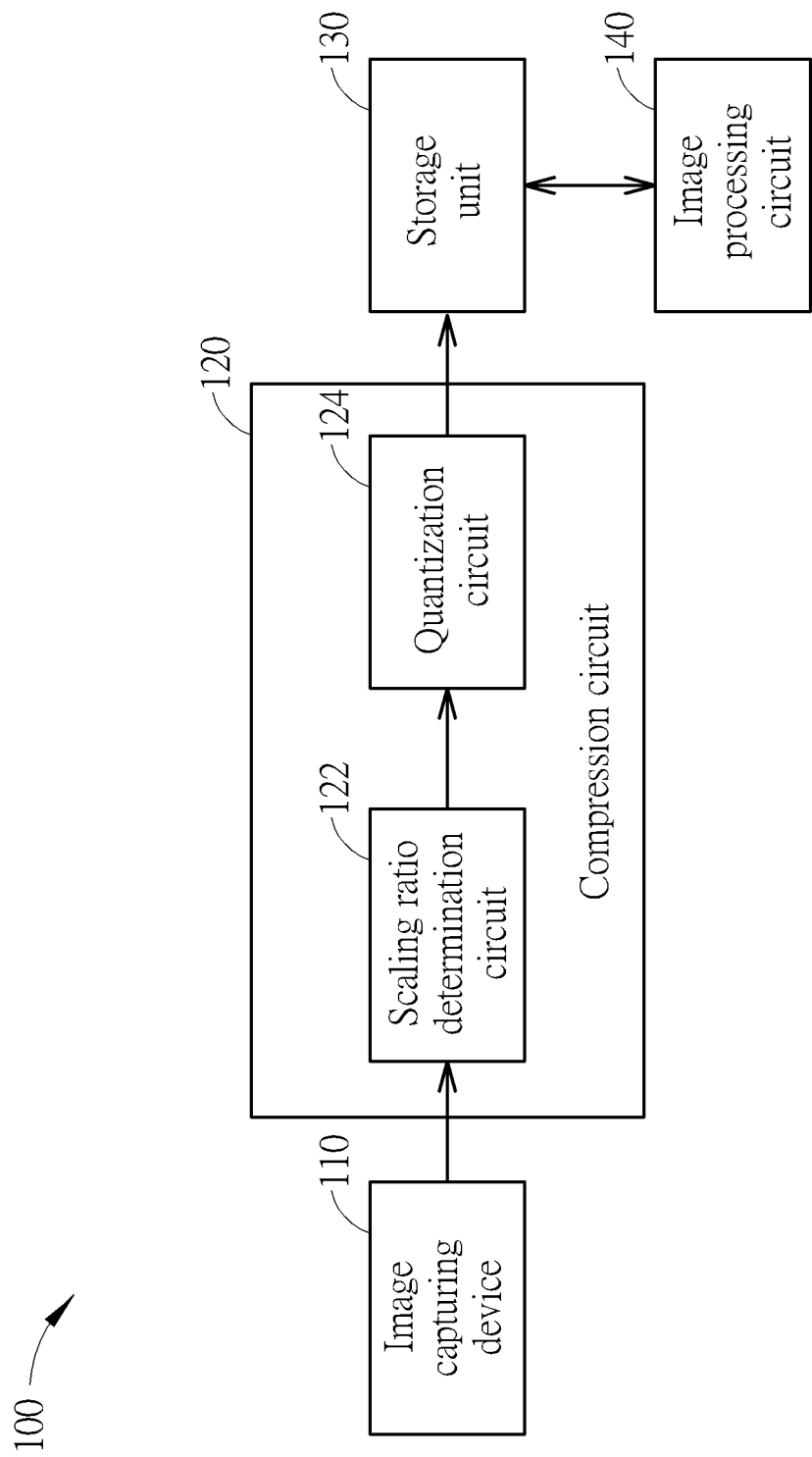
FIG. 1 is a diagram illustrating an electronic device according to one embodiment of the present invention.

FIG. 1 is a diagram of an electronic device 100 according to one embodiment of the present invention. As shown in FIG. 1, the electronic device 100 comprises an image capturing device 110, a compression circuit 120, a storage unit 130 and an image processing circuit 140, wherein the compression circuit 120 comprises a scaling ratio determination circuit 122 and a quantization circuit 124. In this embodiment, the electronic device 100 can be any electronic device that can capture images, such as a digital camera, a notebook, a mobile phone, or a desktop computer with a camera.

In the operation of the electronic device 100, the image capturing device 110 captures the external environment to generate image data such as multiple consecutive image frames. Then, in order to reduce the data amount of the image data, the compression circuit 120 performs data compression on the image data to generate compressed image data, and stores the compressed image data in the storage unit 130. Then, the image processing circuit 140 further reads the compressed image data stored in the storage unit 130, and performs some image processing operations on the compressed image data, such as a noise reduction operation, to generate processed image data to a back-end circuit. In addition, as described in the prior art, the traditional compression circuit may encounter problems such as overload phenomenon, increased data amount, granular noise and edge busyness. Therefore, the compression circuit 120 proposed in this embodiment adopts an adaptive data compression method, which can use different scaling ratios according to the content of the currently processed image data, so as to reduce the data amount as much as possible and reduce granular noise and edge busyness without overloading. In addition, the operations of the image capturing device 110 and the image processing circuit 140 are well known to a person skilled in the art, and these two components are not the focus of the present invention, so the following only describes the operation of the compression circuit 120.

First, the compression circuit 120 is set to have a quantization function Q(x) whose value range is [−R, R], where R can be any suitable value such as '2048', that is, when a value 'x' is between '−2048' and '2048', the operation of the quantization function Q(x) will not have the overload problem.

Then, the compression circuit 120 is configured to have a set of scaling ratios, wherein the set of scaling ratios includes $S_0, S_1, \ldots, S_{n-1}$, where $S_k=2^k$. For example, assuming that n is equal to 4, the set of scaling ratios includes four scaling ratios 1, 2, 4, and 8. In addition, for all possible data 'd' during processing by the compression circuit 120, there is a scaling ratio $S_k$ that can satisfy the following condition $$\frac{|d|}{S_k} \le R.$$

Specifically, assuming that each block processed by the compression circuit 120 has 1*8 pixels, and the luminance value of each pixel is represented by 12 bits, the compression circuit 120 will use a conversion matrix, such as 8*8 Hadamard matrix, to convert the luminance values of 1*8 pixels to a frequency domain to obtain the converted data. In detail, refer to the following formula:

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} * \begin{bmatrix} d1 \\ d2 \\ d3 \\ d4 \\ d5 \\ d6 \\ d7 \\ d8 \end{bmatrix} = \begin{bmatrix} d1' \\ d2' \\ d3' \\ d4' \\ d5' \\ d6' \\ d7' \\ d8' \end{bmatrix}; \quad (1)$$

wherein d1-d8 represent the luminance values of 1*8 pixels respectively, and d1'-d8' represent the converted data respectively. In the 8*8 Hadamard matrix, the first row comprises DC coefficients, and the $2^{nd}$ to $8^{th}$ rows comprise high-frequency coefficients. In this embodiment, the set of scaling ratios is designed by the converted data d2'-d8' calculated by using the high-frequency coefficients, that is, the above-mentioned all possible data 'd' during processing by the compression circuit 120 refers to the converted data d2'-d8' corresponding to the high frequencies. For example, assuming that d1-d8 are $(2^{12}-1), (2^{12}-1), (2^{12}-1), (2^{12}-1)$, 0, 0, 0, 0, respectively, the converted data d5' calculated by using the fifth row of the Hadamard matrix is $4*(2^{12}-1)-4*0<2^{14}$. Since the above-mentioned converted data d5' is a maximum value during processing by the compression circuit 120, the maximum scaling ratio can be designed to be '8', so that $4*(2^{12}-1)-4*0<2^{14}=8*R$, where R is 2048.

Then, in the process that the compression circuit 120 receives the image data from the image capturing device 110 and compresses it, first, for each block, the scaling ratio determination circuit 122 uses the Hadamard matrix to calculate the converted data corresponding to the high frequencies, and determines the scaling ratio of the plurality of converted data according to a largest one of the plurality of converted data corresponding to the high frequencies. With regard to the above-mentioned formula (1), the scaling ratio determination circuit 122 can select a maximum value M of absolute values of the converted data d2'-d8', and find the smallest scaling ratio $S_k$ that can satisfy the condition:

$$\frac{M}{S_k} \le R,$$

and the determined smallest scaling ratio $S_k$ is used for all the converted data d2'-d8'. For example, assuming that R=2048, if the maximum value M of the absolute values of the converted data d2'-d8' is less than '2048', the scaling ratio determination circuit 122 can determine that the scaling ratio is equal to '1'; if the maximum value M of the absolute values of the converted data d2'-d8' is between '2048' and '4096' the scaling ratio determination circuit 122 can determine that the scaling ratio is equal to '2'; if the maximum value M of the absolute values of the converted data d2'-d8' is between '4096' and '8192' the scaling ratio determination circuit 122 can determine that the scaling ratio is equal to '4'; and if the maximum value M of the absolute values of the converted data d2'-d8' is between '8192' and '16384' the scaling ratio determination circuit 122 can determine that the scaling ratio is equal to '8'.

In the operation of the scaling ratio determination circuit 122, the scaling ratio that satisfies the condition $$\frac{M}{S_k} \le R$$

is used to avoid the overload phenomenon mentioned in the prior art (that is, the value of the converted data exceeds the value range [−R, R] of the quantization function Q(x)), and selecting the smallest scaling ratio $S_k$ that satisfies the condition $$\frac{M}{S_k} \le R$$

is to avoid the granular noise and edge busyness during subsequent decoding steps.

After the scaling ratio is determined, the quantization circuit 124 uses the scaling ratio to adjust the converted data d2'-d8' to generate adjusted data (i.e., $(d2'/S_k)-(d8'/S_k)$), and perform a quantization operation on the adjusted data to generate compressed data. That is, the quantization circuit 124 uses the quantization function $Q(d2'/S_k)$ to calculate the compressed data corresponding to the converted data d2', uses the quantization function $Q(d3'/S_k)$ to calculate the compressed data corresponding to the converted data d3', . . . , and uses the quantization function $Q(d8'/S_k)$ to calculate the compressed data corresponding to the converted data d8'. In addition, since the converted data d1' calculated by using the DC coefficients of the first row of the Hadamard matrix may have a greater value, the quantization circuit 124 can independently perform the quantization operation on the converted data d1' to generate the corresponding compressed data.

Then, the compression circuit 120 temporarily stores the compressed data in the storage unit 130. The image processing circuit 140 uses an internal decompression circuit to decompress the compressed data according to an inverse quantization function corresponding to the quantization function Q(x) and the scaling ratio corresponding to each block, to obtain the decompressed data. That is, for each block, the content received by the decompression circuit includes $Q(d'/S_k)$ and the value 'k', and the decompression circuit generates the decompressed data $$D = S_k Q^{-1}\left(Q\left(\frac{d'}{S_k}\right)\right);$$

wherein $Q^{-1}$ is the inverse quantization function, d' comprises the converted data d2'-d8'.

In the above embodiment, since the converted data d2'-d8' corresponding to high frequencies share the same scaling ratio $S_k$, it can be avoided that the data amount of the scaling ratio $S_k$ is too large and affects the overall compressed data. In addition, by determining the minimum scaling ratio $S_k$ that satisfies the condition:

$$\frac{M}{S_k} \le R,$$

it can reduce the data amount as much as possible and reduce the degree of granular noise and edge busyness without overloading.

In one embodiment, assuming that each block processed by the compression circuit 120 includes eight pixels, and the luminance value of each pixel is 12 bits, the converted data d1' is quantized to generate 13-bit compressed data, each of the converted data d2'-d8' is quantized to generate 7-bit compressed data (that is, the number of codewords is '128'), the four scaling ratios can be represented by two bits, so the amount of data generated by the compression circuit 120 can be 64 bits (i.e., 13+7*7+2=64). That is, for a block having eight pixels, the average compressed data per pixel is 8 bits. Therefore, the embodiment can avoid overloading and improve the phenomenon of granular noise and edge busyness while effectively compressing the image data.

It is noted that the size of the above block and size and coefficients of the Hadamard matrix are only for illustrative purposes, rather than limitations of the present invention. In other embodiments, the block size and the corresponding Hadamard matrix processed by the compression circuit 120 can be changed according to the designer's consideration and the content of the image data.

Figure 2:
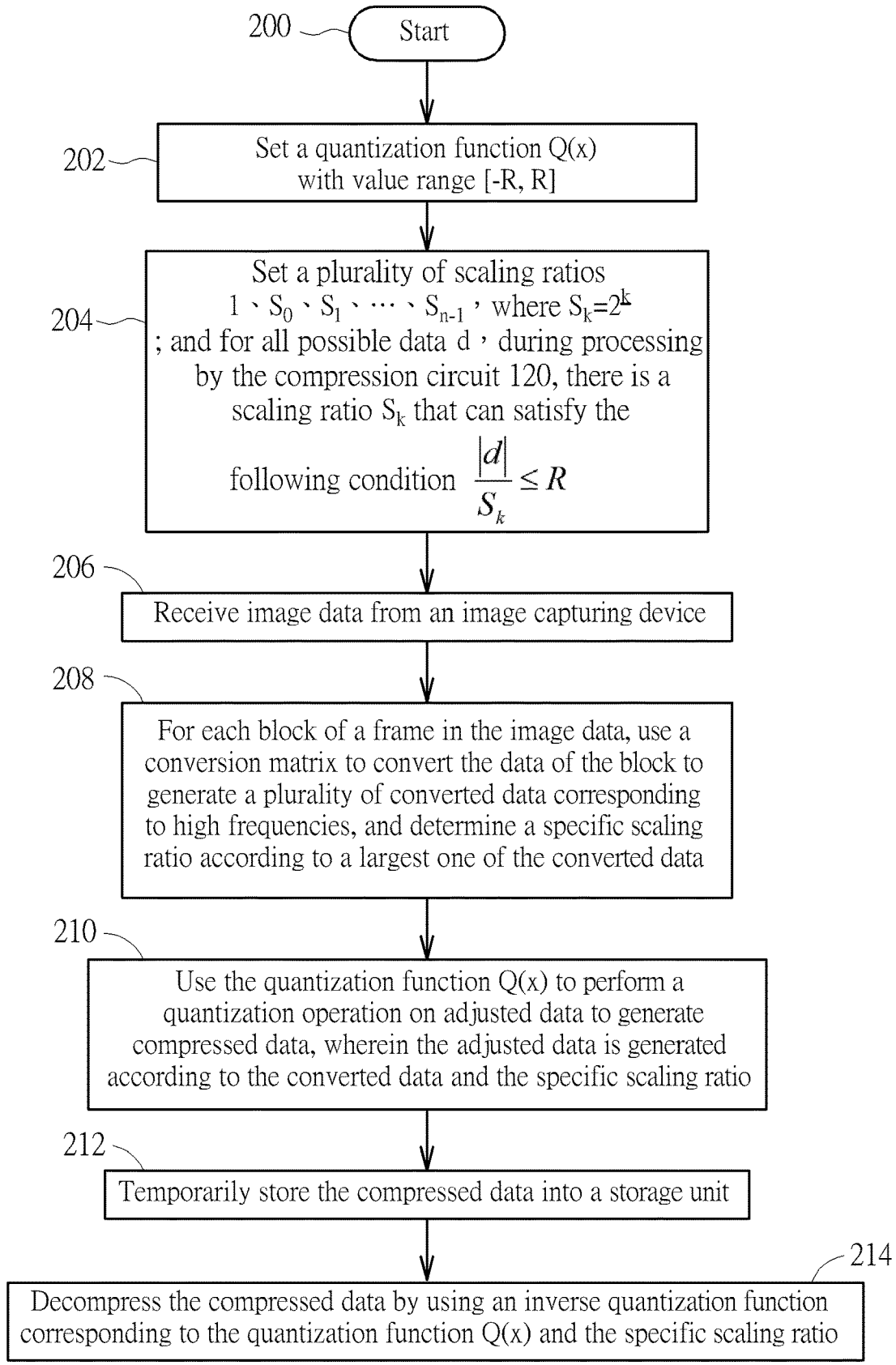
FIG. 2 is a flowchart of a compression method according to one embodiment of the present invention.

FIG. 2 is a flowchart of a compression method according to one embodiment of the present invention. Referring to FIG. 1, FIG. 2 and the above embodiments together, the flow of the compression method is described as follows.

Step 200: the flow starts.

Step 202: set a quantization function Q(x) with value range [−R, R].

Step 204: set a plurality of scaling ratios $S_0, S_1, \ldots, S_{n-1}$, where $S_k=2^k$; and for all possible data 'd' during processing by the compression circuit 120, there is a scaling ratio $S_k$ that can satisfy the following condition $$\frac{|d|}{S_k} \le R.$$

Step 206: receive image data from an image capturing device.

Step 208: For each block of a frame in the image data, use a conversion matrix to convert the data of the block to generate a plurality of converted data corresponding to high frequencies, and determine a specific scaling ratio according to a largest one of the converted data.

Step 210: use the quantization function Q(x) to perform a quantization operation on adjusted data to generate compressed data, wherein the adjusted data is generated according to the converted data and the specific scaling ratio.

Step 212: temporarily store the compressed data into a storage unit.

Step 214: decompress the compressed data by using an inverse quantization function corresponding to the quantization function Q(x) and the specific scaling ratio.

In the above embodiments, the high-frequency coefficients of the Hadamard matrix only correspond a horizontal direction. However, in other embodiments, The Hadamard matrix used by the compression circuit 120 may include a plurality of sub-matrices of high-frequency coefficients in different directions, and each sub-matrix may determine its own scaling ratio according to the largest one of the absolute values of the respective converted data, to more effectively improve the phenomenon of granular noise and edge busyness being amplified during decompression. For example, the Hadamard matrix used by the compression circuit 120 can be represented as follows:

$$\begin{bmatrix} 0 & V & V & V \\ H & D & V & V \\ H & H & D & D \\ H & H & D & D \end{bmatrix};$$

where 'V' represents that the sub-matrix has high-frequency coefficients in the vertical direction, 'H' represents that the sub-matrix has high-frequency coefficients in the horizontal direction, and 'D' represents that the sub-matrix has high-frequency coefficients in the diagonal direction. In this embodiment, all sub-matrices 'V' have a single scaling ratio, all sub-matrices 'H' have a single scaling ratio, and all sub-matrices 'D' also have a single scaling ratio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compression method, comprising:
   setting a quantization function;
   setting a plurality of scaling ratios;
   receiving image data;
   for a block of a frame of the image data, using a conversion matrix to convert data of the block to generate a plurality of converted data;
   determining a specific scaling ratio from the plurality of scaling ratios according to the plurality of converted data; and
   using the quantization function to perform a quantization operation on a plurality of adjusted data to generate compressed data, wherein the plurality of adjusted data are generated by dividing the plurality of converted data by the specific scaling ratio;
   wherein the step of determining the specific scaling ratio from the plurality of scaling ratios according to the plurality of converted data comprises:
   determining the specific scaling ratio from the plurality of scaling ratios according to a largest one of absolute values of the plurality of converted data;
   wherein the quantization function Q(x) is with a value range [−R, R], and the step of determining the specific scaling ratio from the plurality of scaling ratios according to the largest one of the absolute values of the plurality of converted data comprises:
according to the largest one of the absolute values of the plurality of converted data, selecting a smallest scaling ratio that satisfies a condition $$\frac{M}{S_k} \le R$$

from the plurality of scaling ratios to serve as the specific scaling ratio, wherein M is the largest one of the absolute values of the plurality of converted data, and $S_k$ is the specific scaling ratio.

2. The compression method of claim 1, wherein the step of for the block of the frame of the image data, using the conversion matrix to convert the data of the block to generate the plurality of converted data comprises:
for the block of the frame of the image data, using the conversion matrix to convert the data of the block to generate the plurality of converted data corresponding to high frequencies.

3. The compression method of claim 2, wherein the conversion matrix comprises a group of DC coefficients and a plurality of groups of high-frequency coefficients, and the step of using the conversion matrix to convert the data of the block to generate the plurality of converted data corresponding to the high frequencies comprises:
using the plurality of groups of high-frequency coefficients to convert the data of the block to generate the plurality of converted data corresponding to the high frequencies.

4. An electronic device, comprising:
a compression circuit which sets a quantization function and a plurality of scaling ratios, and the compression circuit comprises:
a scaling ratio determination circuit, configured to receive image data, and for a block of a frame of the image data, use a conversion matrix to convert data of the block to generate a plurality of converted data, and determine a specific scaling ratio from the plurality of scaling ratios according to the plurality of converted data; and
a quantization circuit, coupled to the scaling ratio determination circuit, configured to use the quantization function to perform a quantization operation on a plurality of adjusted data to generate compressed data, wherein the plurality of adjusted data are generated by dividing the plurality of converted data by the specific scaling ratio;
wherein the scaling ratio determination circuit determines the specific scaling ratio from the plurality of scaling ratios according to a largest one of absolute values of the plurality of converted data;
wherein the quantization function Q(x) is with a value range [−R, R], and the scaling ratio determination circuit refers to the largest one of the absolute values of the plurality of converted data to select a smallest scaling ratio that satisfies a condition $$\frac{M}{S_k} \le R$$

from the plurality of scaling ratios to serve as the specific scaling ratio, wherein M is the largest one of the absolute values of the plurality of converted data, and $S_k$ is the specific scaling ratio.

5. The electronic device of claim 4, wherein for the block of the frame of the image data, the scaling ratio determination circuit uses the conversion matrix to convert the data of the block to generate the plurality of converted data corresponding to high frequencies.

6. The electronic device of claim 5, wherein the conversion matrix comprises a group of DC coefficients and a plurality of groups of high-frequency coefficients, and the scaling ratio determination circuit uses the plurality of groups of high-frequency coefficient to convert the data of the block to generate the plurality of converted data corresponding to the high frequencies.

* * * * *